C. T. LITCHFIELD & R. BOEKLEN.
Wood-Screw.

No. 161,529. Patented March 30, 1875.

Witnesses.

Inventors
Chas. T. Litchfield
Reinhold Boeklen

UNITED STATES PATENT OFFICE.

CHARLES T. LITCHFIELD AND REINHOLD BOEKLEN, OF BROOKLYN, N. Y.

IMPROVEMENT IN WOOD-SCREWS.

Specification forming part of Letters Patent No. 161,529, dated March 30, 1875; application filed March 20, 1875.

*To all whom it may concern:*

Be it known that we, CHAS. T. LITCHFIELD and REINHOLD BOEKLEN, both of the city of Brooklyn, in the county of Kings and State of New York, have invented certain new and useful Improvements in Wood-Screws; and we do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to the combination of a center-bit point or conical point with a cam-shaped groove and gimlet-like or decreasing screw-thread from the main threaded portion to the point, thus providing the screw with a point situated concentrically, for accurately placing and guiding the screw in entering the wood.

By means of the gimlet-shaped threaded portion the screw enters the wood very readily, and with but little pressure. By means of the cutting-edge at the junction of the gimlet portion with the threaded portion of the screw, the screw, to a certain extent, cuts its way through the wood, thereby relieving the friction on its body.

Figure 1:
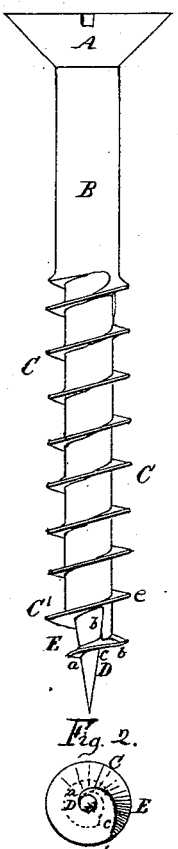
Figure 3:
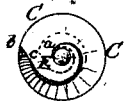
Figure 2:
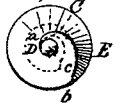

Referring to the annexed drawing, Figure 1 is a side elevation of a screw embodying our invention. Fig. 2 is an end view of the pointed portion of the same.

A represents the head; B, the shank between the head and thread, and C the threaded portion of the screw. The shank B is of less diameter than the threads, as shown; but the head, shank, and threads down to the point marked $e$ may be of any desired form. The extreme end of the screw is provided with a concentrically-situated point, D, similar to that of a center-bit, from the base of which the threaded portion C commences, having a starting portion, $a$, which circumscribes one, or less than one, diameter of the body of the screw at that point, as shown from $a$ to $b$, Fig. 1. The thread emerges or springs from the point D, and gradually increases in breadth or radius until it reaches its full breadth or radius at the point C′, which marks the end proper of the body of the screw, thus imparting to the screw a gimlet-point, while between the two lower threads the body of the screw is cut straight down on one side tangential to the point at its base, thus forming the cutting-edge $b$. By this construction the gimlet portion draws the screw into the wood, the cutting-edges removing the wood before it, and thereby causing less power to be applied to drive the screw into the wood, and with less liability of splitting the wood, than with the ordinary gimlet-pointed screw.

Having thus fully described our invention, what we claim, and desire to secure by Letters Patent, is—

The improved gimlet-pointed screw herein described and shown, the same having a reduced threaded body, C, the thread of which is of equal and uniform radius greater than that of the shank B, and of uniform pitch or spirality, a conical point, D, having a thread of equal pitch with that of the body of the screw, but of which the breadth or radius gradually diminishes until it vanishes entirely in the conical point, and the cutting-shoulder $b$ of the same radius as the body of the screw, extending from the first to the second spiral of the thread, at a point where the radius of the thread is as great or greater than that of the shoulder, for the purpose specified.

In testimony that we claim the foregoing we have hereunto set our hands this 7th day of March, 1873.

CHAS. T. LITCHFIELD.
   REINHOLD BOEKLEN.

Witnesses:
 S. VAN ZANDT,
 A. K. CHAPMAN.